United States Patent
Carter

(10) Patent No.: US 10,989,164 B2
(45) Date of Patent: Apr. 27, 2021

(54) RESONANT UNIDIRECTIONAL WAVE ENERGY CONVERTER

(71) Applicant: Richard W. Carter, Kaneohe, HI (US)

(72) Inventor: Richard W. Carter, Kaneohe, HI (US)

( * ) Notice: Subject to any disclaimer, the term of this patent is extended or adjusted under 35 U.S.C. 154(b) by 0 days.

(21) Appl. No.: 16/285,024

(22) Filed: Feb. 25, 2019

(65) Prior Publication Data

US 2019/0271293 A1 Sep. 5, 2019

Related U.S. Application Data

(60) Provisional application No. 62/710,990, filed on Mar. 5, 2018.

(51) Int. Cl.
*F03B 13/22* (2006.01)
*F03D 9/00* (2016.01)
*H02K 7/18* (2006.01)

(52) U.S. Cl.
CPC .............. *F03B 13/22* (2013.01); *F03D 9/008* (2013.01); *H02K 7/1823* (2013.01); *F05D 2220/76* (2013.01)

(58) Field of Classification Search
CPC .......... F03B 13/10; F03B 13/12; F03B 13/14; F03B 13/141; F03B 13/148; F03B 13/22; F03D 9/008; H02K 7/1823
See application file for complete search history.

(56) References Cited

U.S. PATENT DOCUMENTS

| 430,790 | A |   | 6/1890 | Starkenberg |
| 3,870,893 | A | * | 3/1975 | Mattera ................. F03B 13/183 290/53 |
| 4,009,396 | A | * | 2/1977 | Mattera ............... F03B 13/1805 290/53 |
| 4,078,871 | A |   | 3/1978 | Perkins, Jr. |
| 4,152,895 | A | * | 5/1979 | Wirt ...................... F03B 13/141 60/398 |
| 4,189,918 | A |   | 2/1980 | Moody |
| 4,229,969 | A |   | 10/1980 | Hark |
| 4,263,516 | A |   | 4/1981 | Papadakis |
| 4,327,296 | A | * | 4/1982 | Weyers ................. F03B 13/145 290/53 |
| 4,332,506 | A |   | 6/1982 | Andrews |

(Continued)

FOREIGN PATENT DOCUMENTS

DE 19726504 A1 1/1999
EP 0050183 A1 4/1982
(Continued)

*Primary Examiner* — Viet P Nguyen

(57) ABSTRACT

A wave energy conversion device whereby its structural design and positioning converts oscillating wave energy into unidirectional wave induced water flow. A judiciously placed upper closed perimeter boundary positioned on a submerged horizontally oriented surface pierced with an opening, focuses incident waves inward creating a resonant wave condition where the superposition of waves induces a predominantly downward unidirectional flow through the opening. A segmented sealed upper boundary results in the additional storage of water head due to the overtopping of waves, thus further smoothening and increasing the magnitude of the unidirectional flow. This wave energy converter can be utilized with unidirectional hydro turbines for electrical power generation.

23 Claims, 11 Drawing Sheets

(56) References Cited

U.S. PATENT DOCUMENTS

| | | | |
|---|---|---|---|
| 4,364,691 A * | 12/1982 | Wirt | E02B 3/06 405/26 |
| 4,441,316 A * | 4/1984 | Moody | F03B 13/142 60/398 |
| 4,622,471 A | 11/1986 | Schroeder | |
| 5,443,361 A | 8/1995 | Skaarup | |
| 6,216,455 B1 * | 4/2001 | Doleh | F03B 13/148 290/53 |
| 6,450,732 B1 | 9/2002 | Boccotti | |
| 6,527,504 B1 | 3/2003 | Skaarup | |
| 7,479,708 B1 | 1/2009 | Sternitzke | |
| 8,084,873 B2 | 12/2011 | Carter | |
| 8,564,152 B1 | 10/2013 | Costas | |
| 8,596,056 B2 | 12/2013 | Woodmansee | |
| 8,596,955 B2 | 12/2013 | Freeman | |
| 8,698,331 B2 | 4/2014 | Carter | |
| 9,500,176 B2 * | 11/2016 | Moffat | F03B 13/22 |
| 2011/0095534 A1 | 4/2011 | Hillmann | |
| 2012/0032444 A1 | 2/2012 | Burton | |
| 2014/0246859 A1 * | 9/2014 | Obermeyer | F03B 3/06 290/54 |
| 2014/0252766 A1 * | 9/2014 | Clark | F03B 13/16 290/42 |
| 2015/0167649 A1 * | 6/2015 | Barsacq | F03B 13/16 290/52 |
| 2015/0198137 A1 * | 7/2015 | Hanna | F03B 13/10 290/52 |
| 2017/0058857 A1 * | 3/2017 | Phan | F03B 3/06 |
| 2017/0248113 A1 * | 8/2017 | Santana | F03B 17/063 |
| 2018/0372059 A1 * | 12/2018 | Slachmuylders | F03B 3/186 |

FOREIGN PATENT DOCUMENTS

| | | |
|---|---|---|
| EP | 0767876 B1 | 2/2001 |
| EP | 1861618 B1 | 7/2012 |
| EP | 2042728 B1 | 7/2014 |
| GB | 612175 A | 11/1948 |
| WO | 1984004119 A1 | 10/1984 |
| WO | 1998032967 A1 | 7/1998 |
| WO | 2000071891 A1 | 11/2000 |
| WO | 2003078831 A1 | 9/2003 |
| WO | 2015083100 A1 | 6/2015 |

* cited by examiner

RESONANT UNIDIRECTIONAL WAVE ENERGY CONVERTER

RELATED APPLICATIONS

This Application claims priority to U.S. Provisional Patent Application No. 62/710,990, filed Mar. 5, 2018, and entitled "Resonant Unidirectional Wave Energy Converter" by Richard W. Carter, which is incorporated herein by reference.

BACKGROUND

The foregoing examples of the related art and limitations related therewith are intended to be illustrative and not exclusive. Other limitations of the related art will become apparent upon a reading of the specification and a study of the drawings.

A wave energy converter (WEC) extracts energy from an ocean wave. Various WECs have been attempted, and problems exist with the variety of approaches.

One issue with existing designs, especially with oscillating water column devices, is that they require a specially built bidirectional turbine to extract energy from a wave induced oscillating air flow. Under large wave conditions, the resulting increased air flow can cause stalling of the turbines blades. Additionally, the turbine may first have to be rotated up-to-speed to operate. Furthermore, for other bidirectional turbine designs, the operating blade angle is difficult to predict beforehand for the incident wave climate.

Other devices have inefficiencies. For example, some WECs must be continually moved into the incident wave direction, complicating the device especially with the anchoring system. Others may have to weather the environment rather than being able to submerge in extreme wave conditions. End-of-travel limits of WECs, especially those with linear generators, can limit the range of available power output and cause added stress on working parts due to continual acceleration and deceleration of the power takeoff unit. Turbines blades, which are partially in the air, i.e. not fully submerged, have lower power density and specific speed. A multi-stage turbine or turbines specially built to accept wave surge require designs that add to the complexity, maintenance, and cost of the installation, leading to challenges rather than solutions.

Other known problems include devices with checkvalves, which can malfunction due to biofouling or failure to seal against their stops. Ramps with multiple openings can result in the increased collection of sand and other debris in the different chambers. Fixed ramps may require the entire structure to be raised or lowered to compensate for wave/tidal variations, while variable ramps lack seals to contain water at different angles of inclination.

Some designs seek to avoid problems encountered in deeper waters by only configuring them for shallow water. In shallow water, waves "feel" the resistance of the ocean floor; wave refraction occurs; and breaking waves lose energy due to wave turbulence. Thus, in some designs, less wave energy will be captured in shallow water as compared to deep water. Devices on the shore can have high construction costs with site preparation and are more insensitive to changes in wave height/direction or tidal changes.

Flotsam from the ocean could limit operating effectiveness. Furthermore, significant losses can occur when directing pulsating wave energy down to the sea floor, requiring larger waves for device operation.

What is needed is a simplified, more cost-effective structure for a WEC that would use the focusing structure of the WEC to also rectify the wave induced flow and capture and direct any exiting wave energy to create additional water head, thus smoothening the shaft rotation of the turbine-generator and improving the overall efficiency through increased downward flow. Then, an efficient, proven, cost-effective, commercially available hydro turbine can be applied.

SUMMARY

The following examples and aspects thereof are described and illustrated in conjunction with systems, tools, and methods that are meant to be exemplary and illustrative, not limiting in scope. In various examples, one or more of the above described problems have been reduced or eliminated, while other examples are directed to other improvements.

When a non-breaking wave passes over a submerged horizontally oriented surface near the still water level (SWL) and said surface is pierced with an optimally placed tubular opening, waves are focused inward due to refraction, resulting in an oscillating wave induced flow within the tubular section. This surface can be axisymmetric or non-axisymmetric. Utilizing an upper, closed-perimeter boundary around the submerged horizontal surface, primarily axisymmetric, with the top of the boundary near or piercing the SWL, changes the dynamics of the flow to one that is predominantly downward, allowing low head hydro turbines to be applied when previously only bidirectional turbines could be used in the tubular section. Unidirectional hydro turbines are commercially available, lower in cost and technically proven as compared to bidirectional turbines. This basic component of the WEC will hereinafter be described as a Resonant Unidirectional Bounded Horizontal Structure with Opening (RUBHSO). The cause of RUBHSO's predominantly downward unidirectional wave induced flow and its magnitude relative to the incident wave environment are dependent upon its shape: primarily axisymmetric; size: horizontal structure length, upper closed perimeter boundary height, opening size; and submergence depth: top of boundary near or piercing the SWL.

A portion of the incident waves that travel over the immersed boundary are trapped before leaving the boundary, resulting in inward focused reflective waves. The amplification of the inner wave resonance will depend upon the boundary's inner height to diameter ratio. Superposition of incident and reflective waves results in a net increase in wave height over the tubular opening increasing the wave induced downward flow, while counteracting the upward flow, resulting in a net downward flow through the tubular opening. For optimum power output, the immersed WEC should be situated near the SWL without creating breaking waves above it. Submerging the top of the boundary much deeper or placing it way above the SWL can lessen both the resonant effect as well as the downward flow. As ocean waves are irregular in nature, to help electrically compensate for fluctuations in flow, a generator with a back-to-back converter or induction motor can be deployed depending on conditions and desired applications. Additionally, a flywheel can be added to provide smoother shaft revolutions.

Some wave energy is lost by waves that pass over and exit the immersed boundary. Capturing this energy and converting it into storage energy by increasing contained water height has a smoothing effect and increases the magnitude of the downward flow especially during the time interval when the wave induced downward flow is subsiding. One way this can be achieved by raising the immersed boundary above the SWL. However, the entire structure would have to be raised and lowered to adjust to a varying wave height environment: not too high such that few waves are prevented from overtopping the boundary resulting in excessive incident wave reflections, while not too low that very little water is stored. Increasing head can be more readily accomplished by segmenting the boundary where each section can move independently rather than moving the entire structure up and down. These segments raise or lower depending on the inner contained water level, which is determined by water entering due to overtopping incident waves and water leaving through the turbine-generator opening. The segments also can be forced more downward due to the weight of funneled incident waves or raised to prevent internal waves from exiting. The lower end of the segments is hinged, while the upper end has a float that responds to static and dynamic water levels. The segmented boundary is comprised of multiple channel seal-supports (CS) attached to quadrilateral-shaped surfaces (QS) that together channel the wave run-up and direct the water over the turbine opening. As QS moves up and down, a pliant seal attached between QS and CS and the hinges prevents leakage of contained water. QS can also be fixed at the desired angle.

For internal reflective waves, springs, tension gas springs, or other restraining devices can be used to help dampen the rate of rise of QS before impacting the end-of-travel stop. With increased wave action, the water level rises and QS floats move upward. The run-up angle of inclination then increases allowing more of the wave energy to be potential rather than kinetic, which in turn lessens the wave impact on inner boundaries. With less wave action, the contained water level drops automatically lowering QS, resulting in less obstruction to incident waves. As there are multiple QS, the wave force has less effect on any one segment as it is distributed over multiple segments and is dampened due to the float and the tension gas springs or other attached restraining device. The length of QS and CS can be designed to maximize the water level being stored for specific wave environments. QS can be made flat or curved, so, when upright, it conforms to the outer boundary shape. Detachable external perimeter screening can be applied to keep flotsam out of the device. The WEC can be used for other purposes with the screening removed as QS can then collect flotsam from the ocean.

When inner central blades are present in the WEC, they are ganged, allowing coordinated rotation to the desired optimum flow position. The blades induce fluid swirl, helping to reduce any wave overtopping that may occur at the QS boundary, while augmenting the swirl within the hydro turbine created by the turbine's inner guide vanes. In case of QS sectional malfunction, the blade or blades can be closed and disconnected from the driving mechanism, allowing the defective section or sections to be isolated and permitting the WEC to continue to be operated at reduced power level. The WEC can be designed with or without either the blades or the turbine's inner guide vanes, depending on the desired power output efficiency and cost constraints.

The WEC is raised and lowered with an air chamber to the optimum depth of immersion to achieve maximum power output, making it amenable to changes in wave and tidal conditions and also more easily floated to site. It can be locked into position to vertical upright mounting (VUM) supports fixed to the sea floor. Otherwise, the WEC can be tethered to the sea floor. Once tethered at the desired depth, the buoyancy is increased by adding more air to reduce movement due to wave interaction. With or without the air chamber, the WEC can also be raised and lowered with gear racks or screws driven by hydraulic or motor action when these are applied to VUM supports. Buoyant material within the WEC will limit how far the device will submerge should the air chamber fail.

The WEC's immersed outer perimeter body is angled to refract and surge waves inward toward the contained area. Large incident waves can overtop the entry QS, filling the contained area, while excess waves spill over QS, exiting the device. This device is robust, having two large concentric channel seal-support rings adding structural integrity to the device. The added mass of the water in the contained area helps to reduce the body's movement. Ballast chamber is provided to add stability. In extreme wave conditions, the WEC can be lowered to a safer depth by merely exhausting air from its chamber, submerging the device to a deeper depth. This depth of submergence without air in the chamber is dependent upon the amount of buoyant material placed within the WEC. If no air chamber is present, the WEC will be mechanically lowered.

The WEC can be deployed with multiple inner hydroelectric turbines. There can also be and array of RUBHSO devices with or without an outer submerged refracting border. To optimize the power output, the contained water exiting through each inner hydro turbine is regulated by variable guide vanes or with a valve or siphon action. If the device is of sufficient size, wind turbines can be placed on top of the WEC or WECs, especially for ones that have VUM supports fixed to the ocean floor.

The WEC's inner contained water level is therefore increased by incident wave focusing, channeling of waves with run-up, internal wave reflection and limiting the outflow of water.

BRIEF DESCRIPTION OF THE DRAWINGS

In the following description, several specific details are presented to provide a thorough understanding. One skilled in the relevant art will recognize, however, that the concepts and techniques disclosed herein can be practiced without one or more of the specific details, or in combination with other components etc. In other instances, well-known implementations or operations are not shown or described in detail to avoid obscuring aspects of various examples disclosed herein.

FIG. 5a1 is an exploded view of FIG. 5a showing another configuration of a piston-driven coupling for coordinated rotation of blades. The bearing rod for each blade is mounted on a ring between the channel seal-supports (CS).

FIG. 6e1 shows an alternate view of QS in FIG. 6e having two positions of a tension gas spring applied to one side of the QS, to reduce the rate of impact to end-of-travel stop: outer channel seal-support ring and/or end walls.

DETAILED DESCRIPTION

In the following description, several specific details are presented to provide a thorough understanding. One skilled in the relevant art will recognize, however, that the concepts and techniques disclosed herein can be practiced without one or more of the specific details, or in combination with other components etc. In other instances, well-known implementations or operations are not shown or described in detail to avoid obscuring aspects of various examples disclosed herein.

Figure 1:
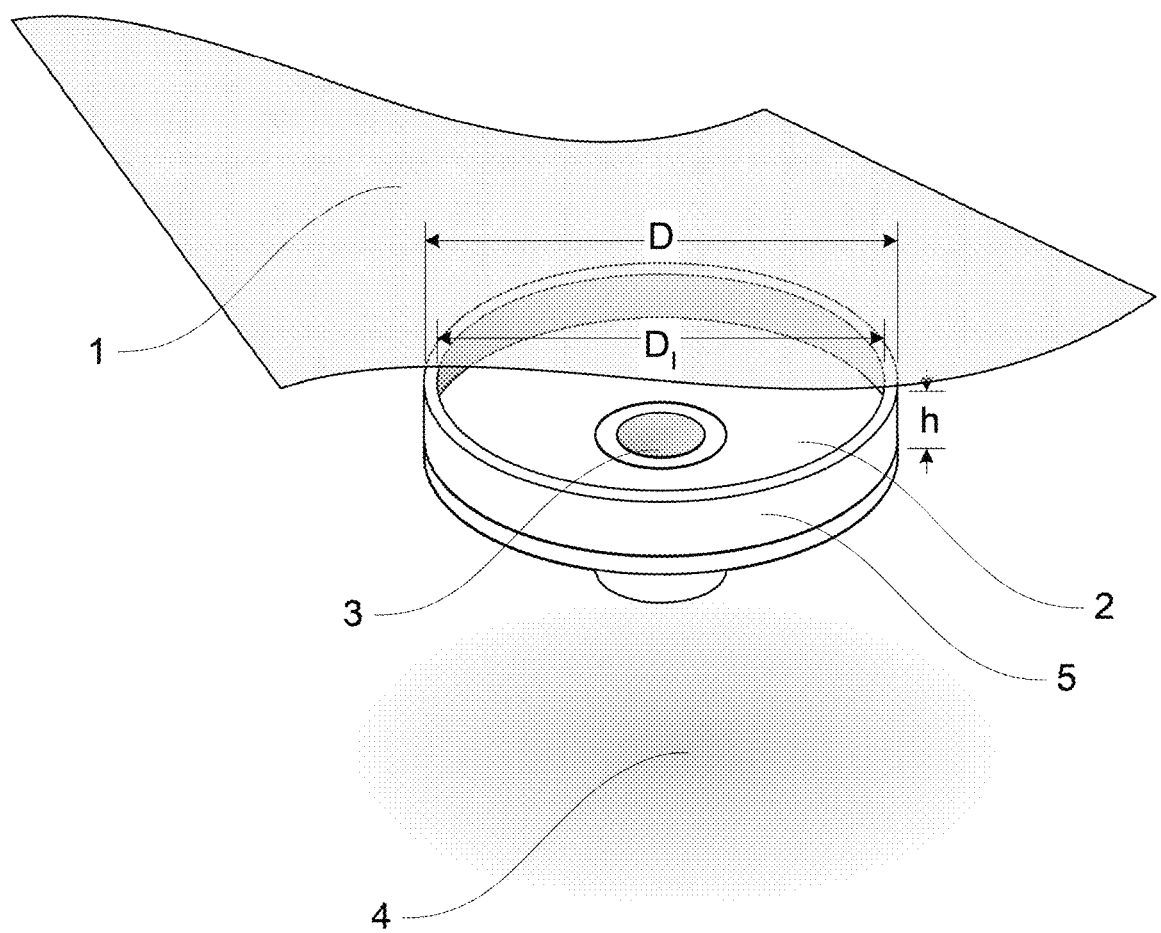
FIG. 1 shows a conceptual view of a monochromatic wave passing over a fixed submerged horizontal disk, pierced in the center with an open tubular section and with added upper closed boundary around the perimeter of the disk.
Figure 2:
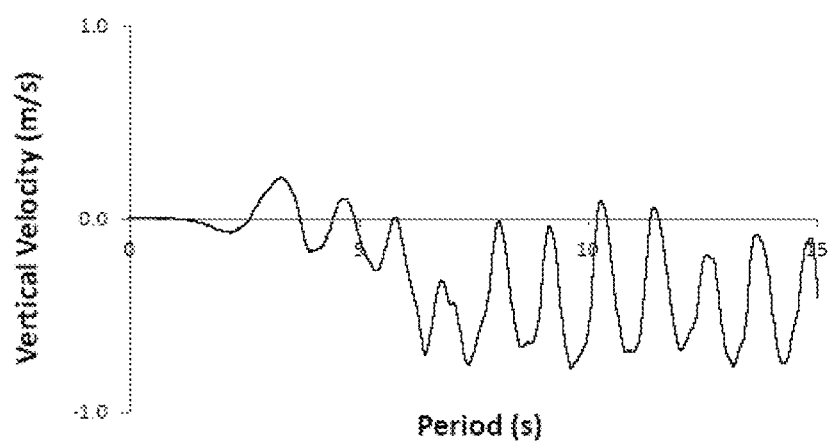
FIG. 2 shows a graphic representation of the vertical velocity versus wave period for the wave induced flow in the tubular section of a fixed submerged horizontal disk with upper closed perimeter boundary of FIG. 1. Downward flow is negative velocity.

FIG. 1 shows nonbreaking monochromatic waves 1 passing over a submerged horizontal disk 2 with an optimally placed (central) opening 3 that pierces through the disk. The disk 2 is located above the seabed 4. Without the non-segmented upper closed perimeter boundary 5 as shown in FIG. 1, the waves will be focused over the disk with diameter (D) and the flow through the opening will oscillate up and down, peaking when the diameter of the disk is tuned to the incident wave conditions. While the disk is an axisymmetric shape, other non-axisymmetric shapes can also be used; however, maximum focusing may not occur. Placing a non-segmented upper closed perimeter boundary 5, on the disk with a specific boundary height (h) to disk inner diameter ($D_1$) ratio, waves become trapped and a resonant wave condition occurs within the boundary resulting in a predominantly downward unidirectional wave induced flow FIG. 2 (here, $h/D_1=0.17$). For this figure downward flow through the opening (FIG. 1:3) is negative. For this to occur, the top of the boundary must be near the SWL and non-wave breaking conditions should be present above it. The superposition of incident and reflected waves enhances the downward flow, while upward flow is reduced resulting in a net downward flow. In FIG. 2, it can be noted that it takes more than one wave period before the net downward flow is established. By adding a flywheel or relying upon the added inertia of the turbine-generator, any minor positive zero crossing of the fluid flow can be dampened out allowing for smooth rotation in one direction. A unidirectional hydro turbine within the tubular opening can then be utilized to harvest shallow or deep-water wave energy over a wide range of wave frequencies. Placing the disk much deeper, or the top of the closed perimeter boundary way above the SWL, can lessen the resonant condition and the net downward flow cannot be guaranteed.

Figure 3:
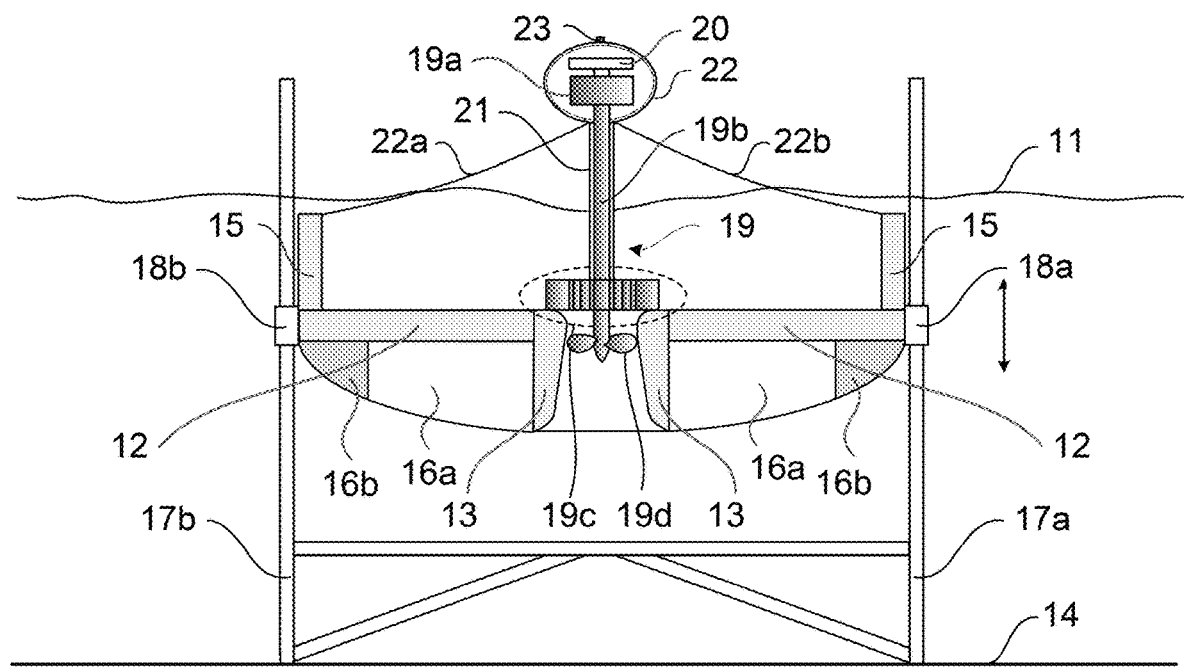
FIG. 3 shows a schematic side view of the immersed buoyant structure with upper closed boundary having a propeller, Kaplan or other reaction hydro turbine. The WEC is movable up and down and is locked into position on VUM supports fixed to the sea floor.

FIG. 3 shows a schematic side view of the horizontal structure 12, pierced with a draft tube 13, having an non-segmented upper closed perimeter boundary 15, locked in position to VUM supports fixed to the sea floor 14 and undergoing very little wave action 11. Varying the air in the air chamber 16a, allows the WEC to be varied up and down on the VUM supports 17a and 17b to compensate for tidal or wave climate in order to obtain optimum submergence depth for power output. This operating position can be clamped into position at 18a and 18b. Two or more upright supports and clamps can be installed. With or without an air chamber, the WEC can also be raised and lowered with gear racks or screws driven by hydraulic or motor action when applied to VUM supports. The air chamber 16a can be made rigid of steel or other material so that the buoyant position changes as the trapped air volume is altered due to changing the water level in the chamber or the chamber can be made of a flexible material such as rubber where the chamber expands or collapses as the air volume is varied. Additional solid ballast, such as metal, concrete, sand or variable fluid ballast such as water placed in the ballast chamber 16b is present to help stabilize the WEC. Depending on the design, commercially available parts for the shaded turbine-generator assembly 19, may be available especially for small installations where a low head reaction hydro turbine could be installed. The turbine-generator assembly 19 is made up of the generator that can be with or without gearbox and or brake represented by 19a, turbine-generator shaft 19b, guide vane assembly 19c and unidirectional turbine (UT) runner 19d. The turbine assembly includes the guide vane assembly 19c and UT runner 19d. For added safety, on this and accompanying drawings, the turbine-generator 19a shown could also include a brake when the shaft is required to be fixed, such as when doing maintenance. Additionally, a flywheel can be added 20 to provide smoother shaft revolutions. An outer tube 21 supports the generator and/or gearbox/brake or flywheel contained in a waterproof housing 22. This housing 22 is shown above the SWL so as not to interfere with the wave action and flow to the UT runner, provide easier accessibility for maintenance and reduce the chance of water leaking into the electrical compartment. The design height of housing 22 is considered relative to the overall center of gravity of the WEC. Optional guide wires 22a and 22b are used to stabilize the housing. Improved power output will occur if the guide vanes within the guide vane assembly 19c are adjustable and also if the blades of the UT runner 19d are variable, as in the Kaplan turbine. Variable guide vanes allow for regulated flow of contained water exiting through the turbine; however, the flow can be controlled with a valve or siphon action. The draft tube 13 directs the swirling flow from the guide vane assembly 19c to the UT runner 19d and reduces the output fluid velocity when leaving the UT runner 19d, helping to prevent cavitation at the blades. The WEC's position at night is indicated by marine navigation light 23.

Figure 4A:
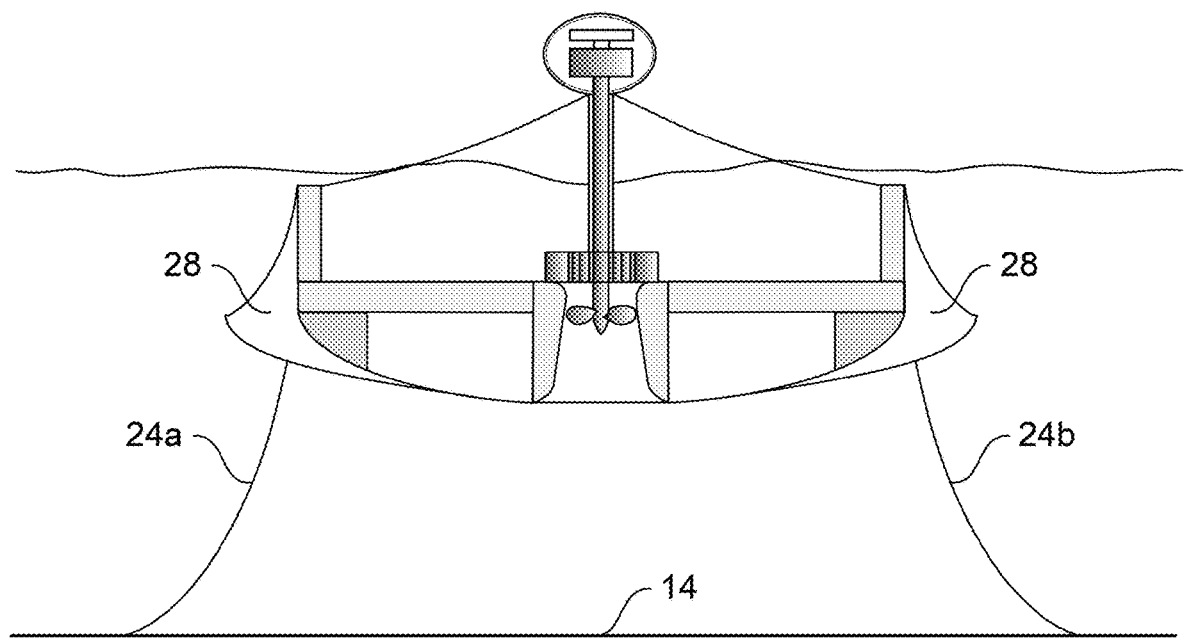
FIG. 4a shows a schematic side view of the immersed buoyant structure with upper closed boundary having a propeller, Kaplan or other reaction hydro turbine with the mooring tethered to the sea floor. An outer run-up boundary can be optionally extended.

FIG. 4a shows a schematic view of the WEC in FIG. 3 having a mooring tethered to the sea floor. The WEC is shown firmly anchored with cables 24a and 24b to the sea floor 14. More cables can be applied as need be. Once tethered to the sea floor, the neutrally buoyant WEC's air chamber is increased with air to compensate for downward movement due to the weight of waves passing over the WEC and to avoid movement relative to the wave. In order to reduce incident wave reflection and increase wave overtopping, the outer fixed run-up surface 28 can be optionally extended. This is also possible with the WEC shown in FIG. 3 and FIG. 4b.

Figure 4B:
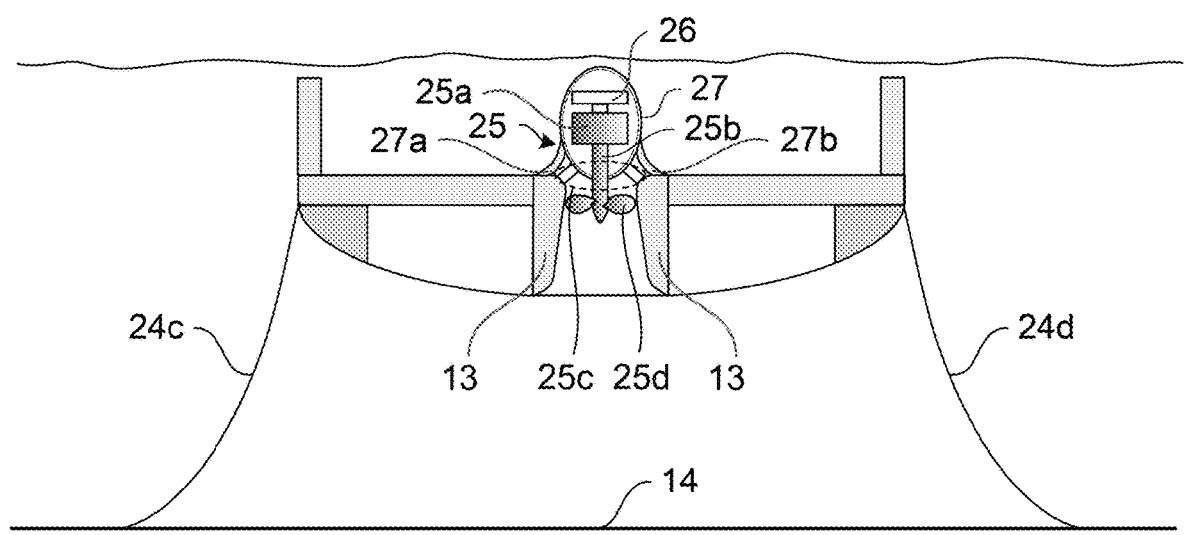
FIG. 4b shows a schematic side view of the immersed buoyant structure with upper closed boundary having a bulb or other totally submerged hydro turbine and with the mooring tethered to the sea floor.

FIG. 4b shows another schematic view of the WEC in FIG. 3 now having a bulb turbine or other totally submerged hydro turbine with mooring tethered to the sea floor. The WEC is shown tethered with taut cables 24c and 24d to the sea floor 14 having a similar mooring as in FIG. 4a. The bulb turbine-generator assembly 25 is shown with a generator and/or gearbox/brake 25a, turbine-generator shaft 25b, guide vanes assembly 25c and UT runner 25d. Optional flywheel 26 is shown. The generator and/or gearbox/brake or flywheel are enclosed in a waterproof housing 27 that has mounting supports 27a and 27b of which there can be multiple. Also shown is draft tube 13.

To further improve the overall efficiency of the WEC, lost wave energy from incident waves reflecting off of the outer immersed closed perimeter boundary and leaving the device when passing over (FIG. 3:15), is now addressed. By making the closed perimeter boundary surface-piercing and more compliant; that is, lowering the boundary on entry of the waves and raising the boundary before the wave exits, more wave energy can be harvested resulting in an increased water level (head) above the hydro turbine, and an increased downward flow, providing a smoother operation. This improved WEC, shown in schematic views FIGS. 5a-8, shows a segmented sealed upper boundary and can be used primarily with a unidirectional turbine. Possible fixations of the WEC to the sea floor in the following figures are as depicted in FIGS. 3-4b.

Figure 5A:
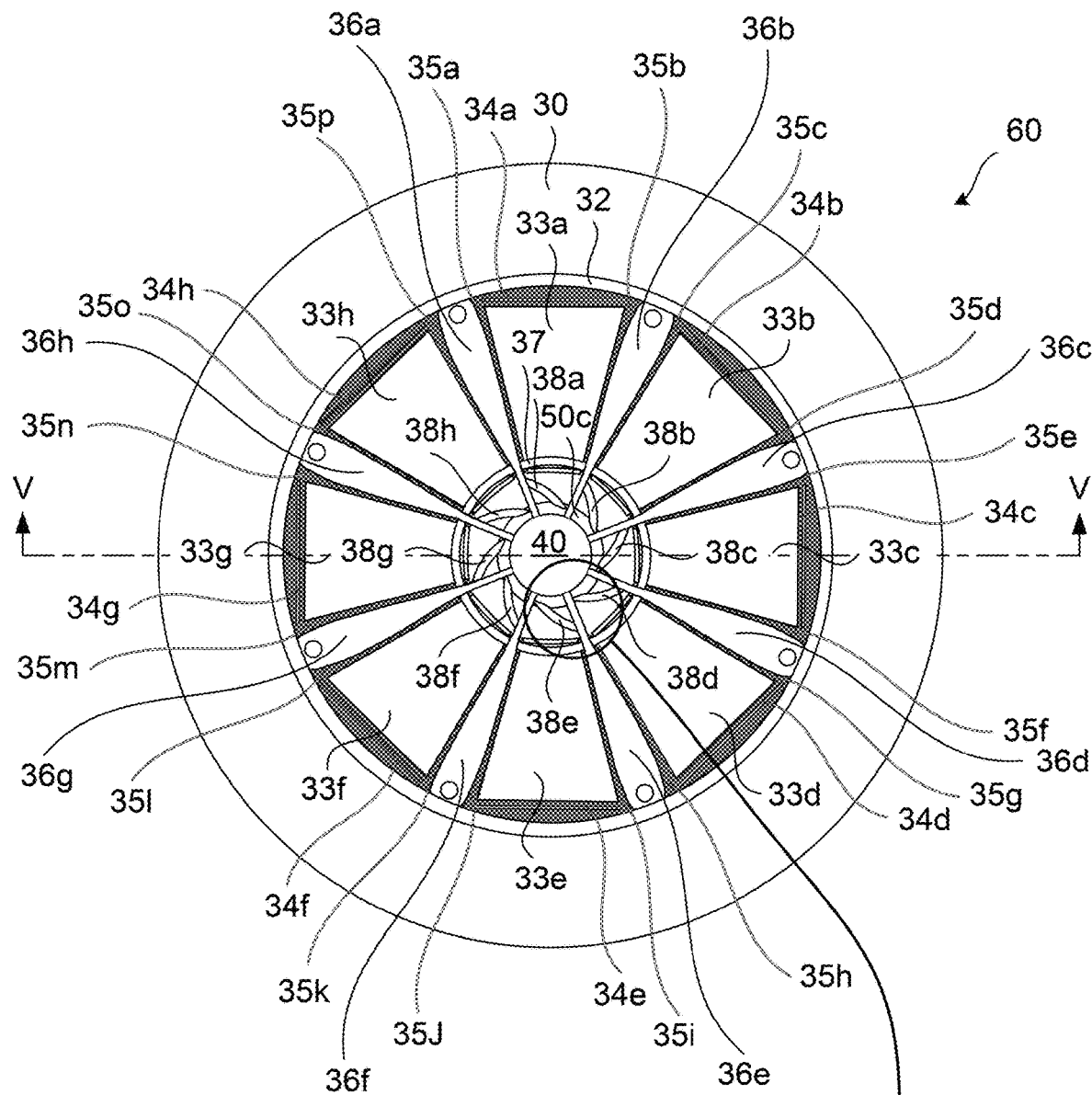
FIG. 5a shows a schematic top view of the modified immersed buoyant structure with segmented sealed upper boundary made up of eight variable QS that capture incident waves, reflect inner waves and raise the contained water level. The channeled waves interact with inner blades that create a swirling action to the water before entering the hydro turbine's guide vanes located beneath the housing containing the generator. One end of each blade is supported. Also shown are inner and outer concentric channel seal-support rings.
Figure 5A:
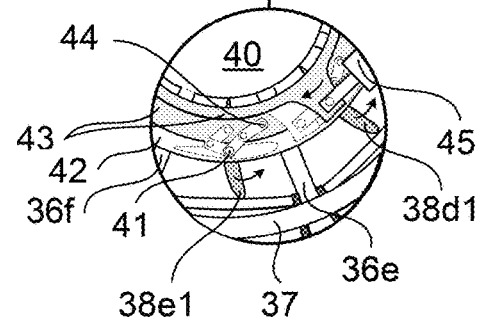

FIG. 5a is a schematic top view of the modified immersed buoyant structure with segmented sealed upper boundary described in the previous paragraph. Cross-sectional view V of the schematic will be described later. Incident waves arriving from any direction are focused inward due to the immersed circular axisymmetric shape. The components 60 shown in the top view of the WEC FIG. 5a will be briefly described, proceeding from the outer to the inner parts of the device. On entry, the incident waves first pass over the buoyant outer submerged buoyant compartment 30. This submerged buoyant compartment, (more clearly shown in side view FIG. 5b), when filled with air, provides an upward force balancing the downward force of the weight of the assembly and any water captured within the WEC, which is stored above the SWL In normal operation, waves pass under the outer channel seal-support ring 32, entering the QS 33a-33h. As desired, the number of QS can be varied. Each QS can be mounted at a fixed angle or attached by hinges shown pliant seals cover hinges 34a-34h. When hinged, each variable upper run-up surface QS adjusts independently to the incident wave climate, rising by means of a float attached to the non-hinged end. Each QS is made of a rigid outer material such as steel with an inner buoyant material like foam. This structure, in combination with the buoyancy of the float, results in the float maintaining a position just above the inner water level. QS can be made flat or curved with a contour similar to ring 32. QS can have different lengths shorter than the radius of the ring 32, while not too short as this is the limiting factor of available inner water height. Pliant seals 35a-35p made of nonporous material such as rubber is placed around the edges of each QS and attached with glue or other means to CS 36a-36h and the pliant seals cover hinges 34a-34h mounted to the horizontal structure (FIG. 6a:52) to prevent leakage. With run-up of the waves over QS and funneling of CS, water is channeled inward and the wave height increases before it enters the center of the device. Each CS is made of a buoyant material such as foam covered with a protective coating such as fiberglass and can be straight or foil shaped to reduce flow resistance. The optimal length of QS together with CS can be determined by the prevailing wave environment.

Continuing with FIG. 5a, the wave leaves QS and passes under the inner channel seal-support ring 37. Inner and outer concentric channel seal-supporting rings 32 and 37 add structural integrity to the WEC. The wave is then deflected by fixed or movable inner blades 38a-38h. These blades reduce sloshing action to prevent overtopping of QS, while imparting swirling action to augment the kinetic flow energy created by the guide vane assembly 50c that sets the correct angle of attack for the turbine runner blades. The WEC's ganged inner blades 38a-38h rotate together, each having the same angular movement. The pointed end of the blades rotates while the other end has a bearing located within CS 36a-36h. The blades could be ganged together with a motor driving a chain connected to sprocket wheels on each blade rod.

A better coupling arrangement for the WEC's inner blades is shown in FIG. 5a1, similar to that found on most hydro turbine guide vane assemblies. While this view represents the operation of all the blades, only blades 38d1 and 38e1 are shown in this magnified view. The waterproof housing 40 containing the generator and/or gearbox/brake is shown as a reference point going from FIG. 5a to FIG. 5a1. The blade rod 41 is placed in the center of blade 38e1, which is mounted on a coupling ring 42 between CS 36e and 36f. The ring 42 is fixed, while the coupling ring 43 rotates driven by an air or hydraulic fluid actuated piston 45 or the ring 43 can also be moved by a motor driven screw (not shown). Extension of the piston 45 causes the blades to move to the closed position. Should one or more of the QS segments become inoperable, all the blades should first be closed and pin 44 then removed and rod 41 clamped into position (clamp not shown). The WEC can then operate at a reduced power level as the other QS sections are still fully functional.

Figure 5B:
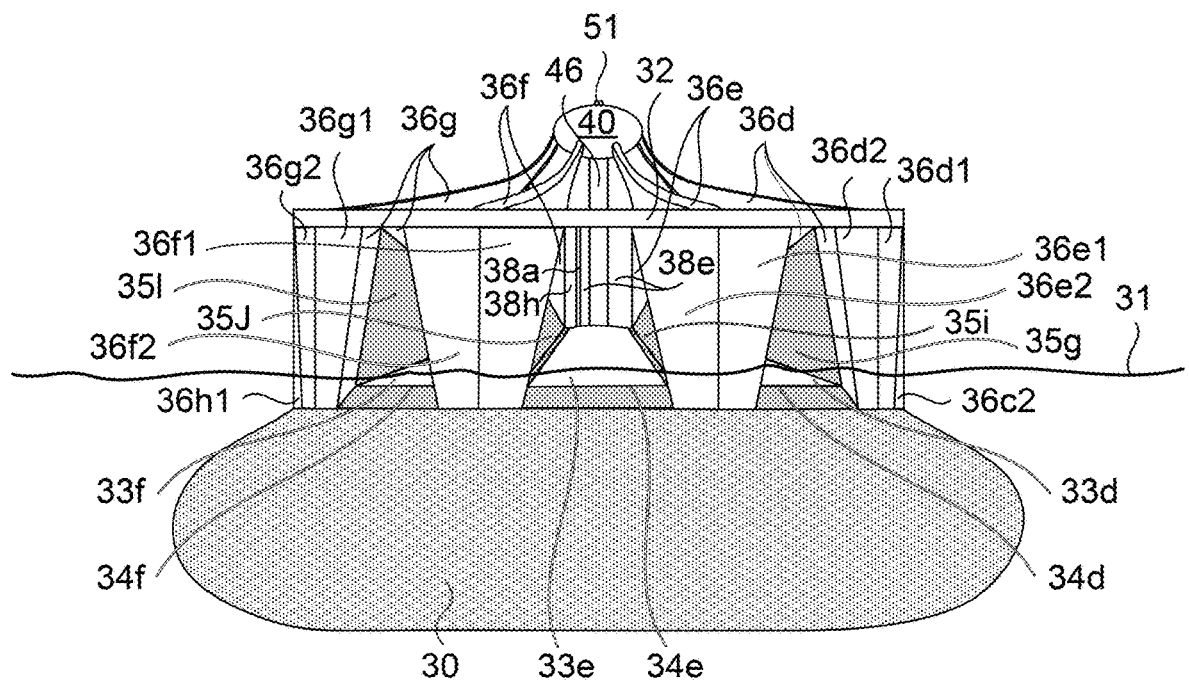
FIG. 5b shows a schematic side view of FIG. 5a. Visible are three run-up QS with entry openings for incident waves, the pliant seals around these surfaces and the supporting CS. Also shown are end walls, outer channel seal-support ring, waterproof housing and the submerged section.

FIG. 5b shows a schematic side view of the WEC. The submerged buoyant compartment 30 has an air chamber (FIG. 6a:30a) adding buoyancy to the WEC. Similar to FIG. 3, FIG. 4a and FIG. 4b, the WEC can be restrained to VUM supports fixed to the sea floor or firmly tethered to the sea floor, while having the ability to move up and down to compensate for wave or tidal conditions. Incident waves 31 enter and run-up QS 33d-33f, with QS flexing at the covered hinges at 34d-34f. The pliant seal of QS can be seen at 35g, 35i, 35j, 35l, and attached to CS 36d-36g. Connected to each CS are end walls shown at 36c2, 36d1, 36d2, 36e1, 36e2, 36f1, 36f2, 36g1, 36g2, and 36h1. These end walls provide an additional end-of-travel stop for QS, preventing the pliant seal from bulging outward when QS moves upward and protecting the pliant seal from direct wave action. Ring 32 is the main end-of-travel stop for QS. Parts of the inner blades 38a, 38e and 38h are visible. The waterproof housing 40 is shown supported by the tube 46 along with CS 36d-36g. A marine navigation light 51 is mounted on top of the waterproof housing 40.

Figure 5C:
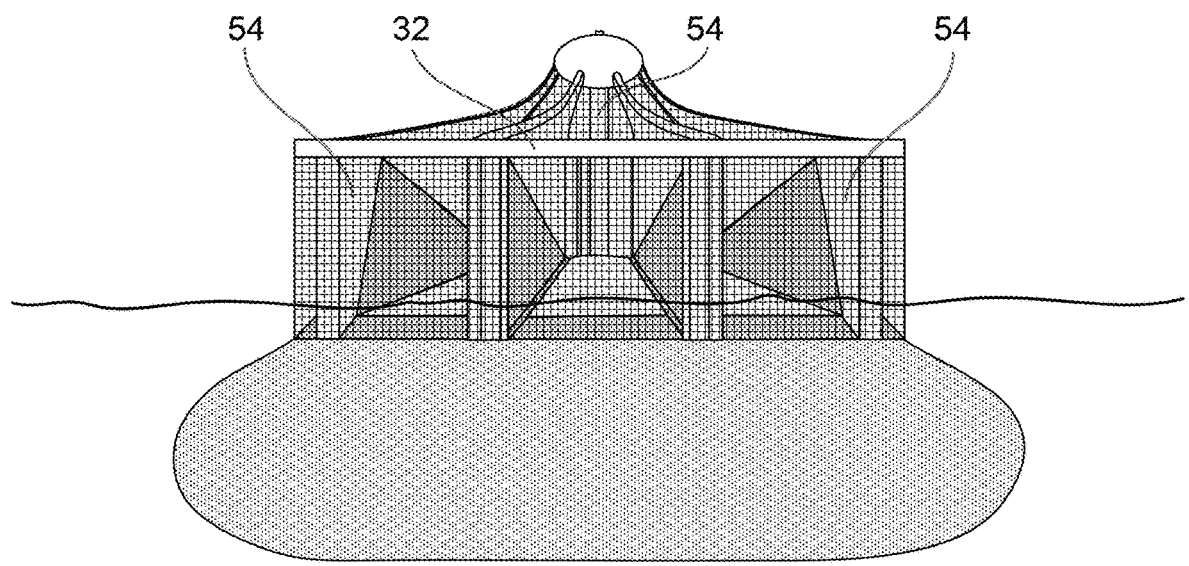
FIG. 5c shows a schematic side view similar to FIG. 5b without end walls and with detachable external perimeter screening.

FIG. 5c shows a schematic side view of the WEC without end walls. The main QS end-of-travel stop ring 32 is shown. By removing the end walls, at larger wave heights, the flow into the device is moderately increased; however, the pliant seals are more exposed to the ocean and can bulge outward when QS is fully extended. When a detachable external perimeter screening 54 is placed around each segment or around the entire circumference, the pliant seals are more readily kept in place. Screening can also be placed on top. The screening not only protects the pliant seals from impact of external flotsam, it also keeps large debris from entering the device. The screen opening size is kept large enough so as not to have much of an effect on incident wave action or blockage created by biofouling, while small enough to block large floating objects and aquatic animals from entering the WEC. For maintenance purposes, screens can be easily replaced and cleaned or repaired away from the device to minimize any downtime. If the screen is not present, QS could also be used in places in the ocean littered by flotsam such as plastic. With each surge of the incident wave, the floating flotsam is channeled and overtops QS with the wave, while being prevented from leaving the contained water area due to the float on QS.

Figure 6A:
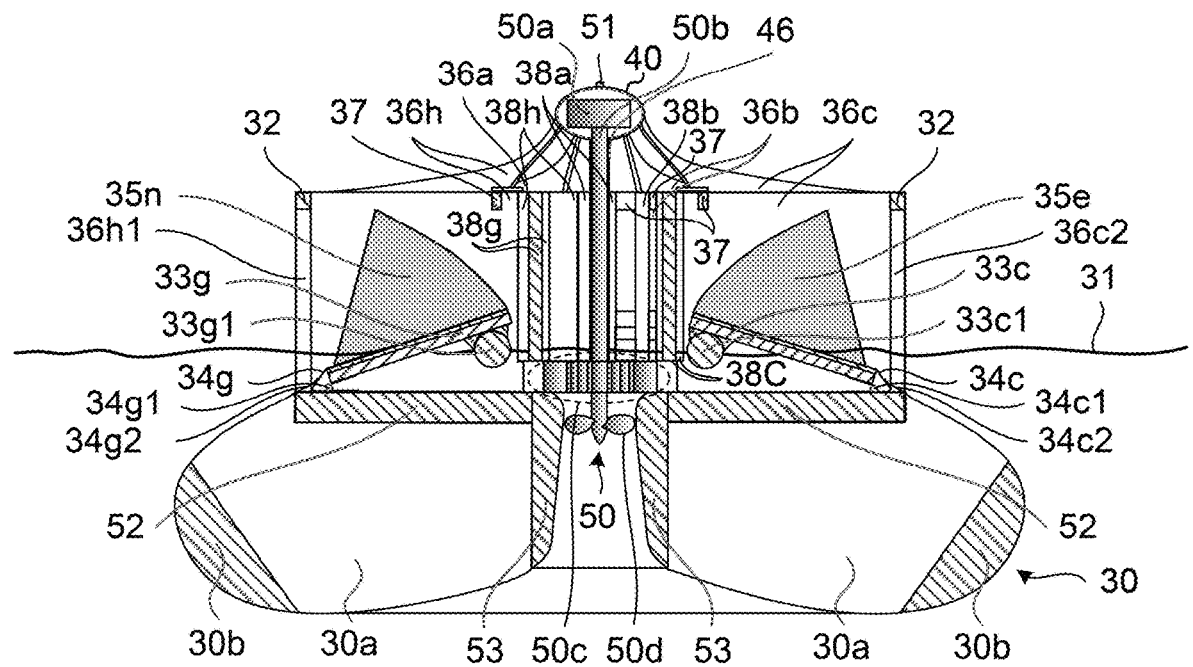
FIG. 6a shows a schematic sectional side view V of FIG. 5a in the quiescent state. Visible are both QS and floats resting at the SWL with pliant seals fully extended. Also visible is the turbine-generator assembly, the CS, inner blades, concentric outer and inner channel seal-support rings and the submerged buoyant body having air chamber and ballast chamber.

FIGS. 6a-6g shows schematic cross-sectional views V of FIG. 5a. In FIG. 6a, the WEC is in the quiescent state where there is very little wave action 31. The submerged buoyant compartment 30 is made up of an air chamber 30a and a ballast chamber 30b. The air chamber 30a can be made rigid of steel or other material so that the buoyant position changes as the trapped air volume is altered due to changing the water level in the chamber or the chamber can be made of a flexible material such as rubber where the chamber expands or collapses as the air volume is varied. As mentioned previously, the air chamber adds buoyancy to the WEC, compensating for changes in inner water level as well as outer tidal or wave climate changes. The submergence depth is set for the optimum power output. The ballast chamber 30b is filled with a dense material such as metal, concrete or sand or has variable fluid ballast such as water that counterbalances any tilting action of the device due to wave action, especially when the WEC is repositioned. The turbine-generator assembly 50, which may be commercially available, is made up of the generator as shown 50a, and/or gearbox/brake, turbine-generator shaft 50b, guide vane assembly 50c and UT runner 50d. The turbine assembly includes the guide vane assembly 50c and UT runner 50d. The generator and/or gearbox/brake 50a is mounted in the waterproof housing 40 and the turbine-generator shaft 50b is within the tube 46. The tube 46 and CS 36a, 36b, 36c, 36h, support the waterproof housing 40. The entire assembly is mounted over draft tube 53 which directs the swirling flow from the guide vane assembly 50c to the UT runner 50d. The draft tube 53 also helps to prevent cavitation at the runner blades. The horizontal structure 52, resting on top of the air chamber 30a, is made of a rigid exterior material such as steel or reinforced concrete and can be filled with foam so that in combination with CS (FIG. 5a:36a-36h), it has a failsafe condition that the ring 32 remains near the SWL should the submerged air chamber 30a leak by filling completely with water. Readily visible is QS 33c and 33g with corresponding float 33c1 and 33g1. End walls 36c2 and 36h1 can also be observed. Pliant seals 35e and 35n made of a flexible material will fold as QS moves upward with the rise of inner water level. Likewise, a similar nonporous flexible material covers the hinges 34c1 and 34g1 at 34c and 34g respectively. An additional nonporous covering 34c2 and 34g2 fills the gap between the adjustable hinge of QS and submerge buoyant compartment 30, providing a smoother ramp for incident waves. Inner and outer concentric channel seal-supporting rings 32 and 37 strengthen CS 36a, 36b, 36c and 36h. The CS supports are constructed higher where they are attached to the waterproof housing 40, to keep the generator enclosure above the wave crests that converge at the center of the WEC. Two end walls 36c2 and 36h1 are attached to CS 36c and 36h respectively. Inner blades 38a, 38b, 38c, 38g and 38h help to reduce wave sloshing within the boundaries and promote circular rotation of fluid in the center of the WEC, augmenting the kinetic energy generated by the guide vane assembly 50c. The marine navigation light 51 can be seen above the waterproof housing 40.

Figure 6B:
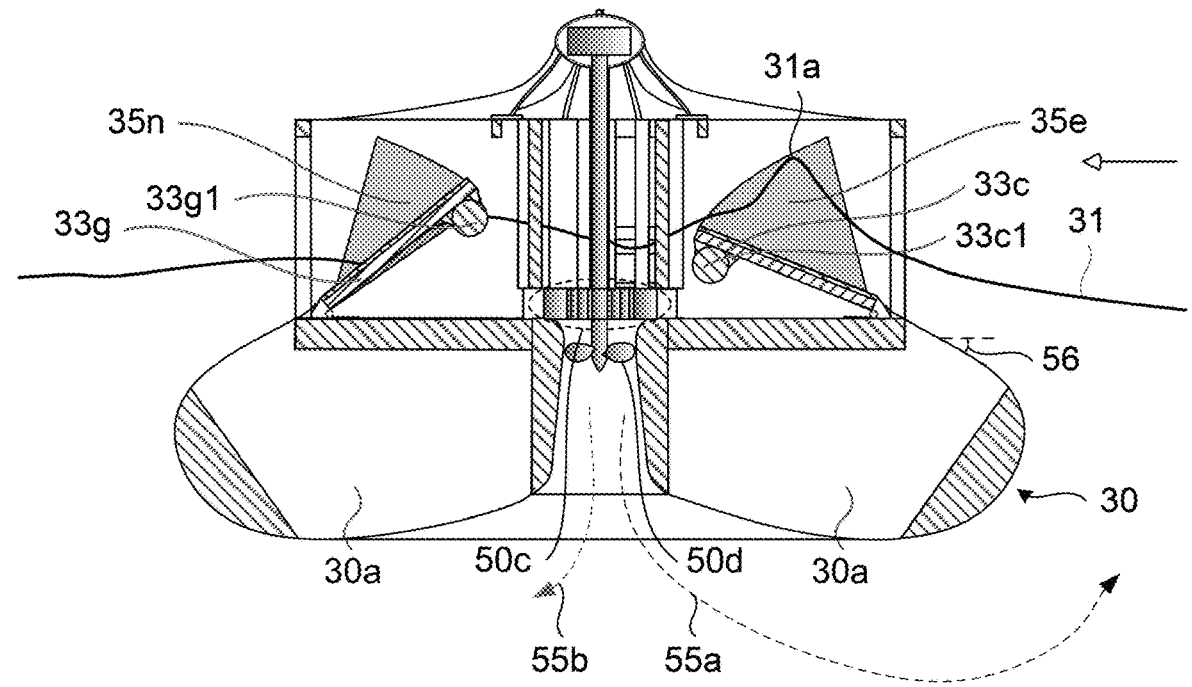
FIG. 6b shows another schematic sectional view of FIG. 6a with an incident wave moving to the left. Visible is wave overtopping of the right float, filling of the contained area and wave blocking by rising of the left float. Movement of the left pliant seal can also be readily seen. Also visible is the wave induced flow of low magnitude leaving the turbine-generator assembly.

FIG. 6b shows a schematic sectional drawing of the WEC encountering an incident wave moving to the left 31. The wave surges into QS 33c where it encounters the fixed lower run-up surface of the submerged buoyant compartment 30, which is at an angle of 15 to 45 degrees to the SWL 56. The depth of the submerged buoyant compartment 30 is determined by the amount of air in air chamber 30a. The wave height is increased 31a as it runs up QS 33c. Water flows over QS and fills the contained area and raises the float 33c1. The pliant seals 35e and 35n completely enclose the segments of the upper boundary and prevent captured water from exiting the WEC. The wave, on reaching the opposite end of the contained area, raises QS 33g by pushing up the float 33g1. Downward flow through the guide vane assembly 50c turns the UT runner 50d. This flow occurs when the trailing slope of the wave passes over the guide vane assembly 50c and also the contained water height increases. On exiting, the water flow 55a is somewhat greater than 55b, due to the trough of the incident wave. For this and ensuing sectional diagrams, the exit flows relative to inner wave oscillations are an illustrative way to present a conceptual concept, and do not precisely represent actual conditions.

Figure 6C:
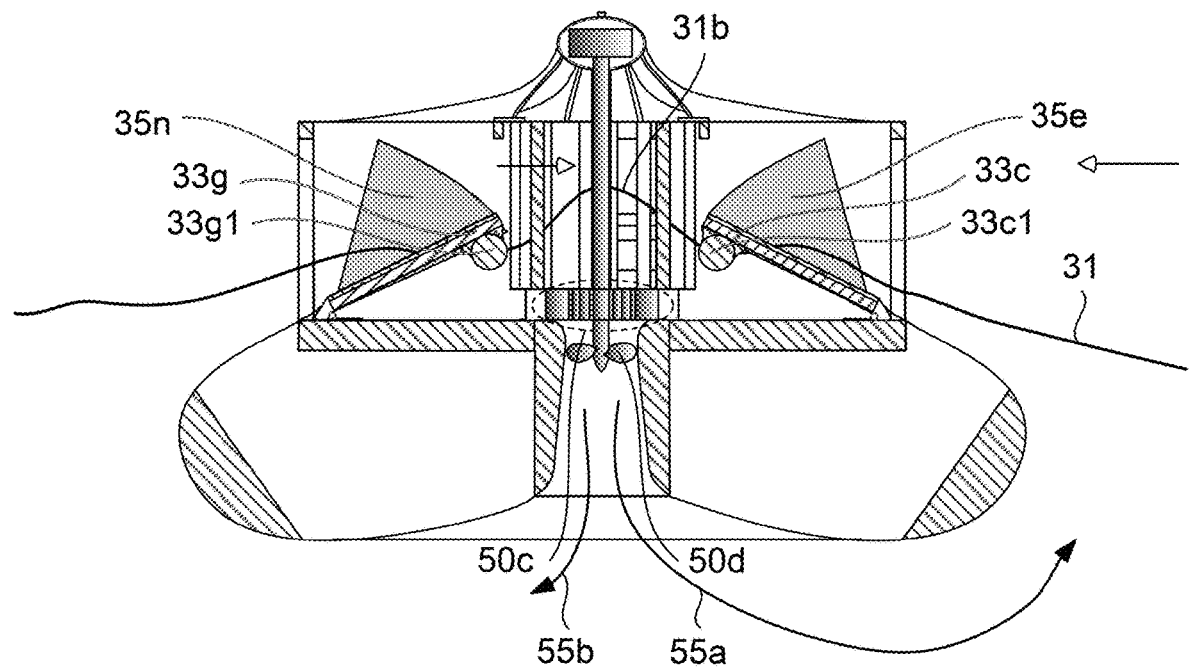
FIG. 6c shows another schematic sectional view of FIG. 6a with an incident wave moving to the left and a reflective wave moving to the right. Visible is that the incident wave has receded on the right QS and the reflective wave is leaving the left float towards the right float. Also visible is the wave induced flow of larger magnitude leaving the turbine-generator assembly.

FIG. 6c is a schematic sectional drawing continuing with the wave action of FIG. 6b, where a reflective wave 31b leaves QS 33g and is focused to the center of the WEC in the direction of QS 33c. This reflective wave with the trailing edge of incident wave 31 creates an increase of downward flow 55a and 55b through the guide vane assembly 50c and driving the UT runner 50d. The floats 33c1 and 33g1 and the pliant seals 35e and 35n have moved relative to the new water level. The incident wave 31 has receded and is no longer overtopping QS 33c.

Figure 6D:
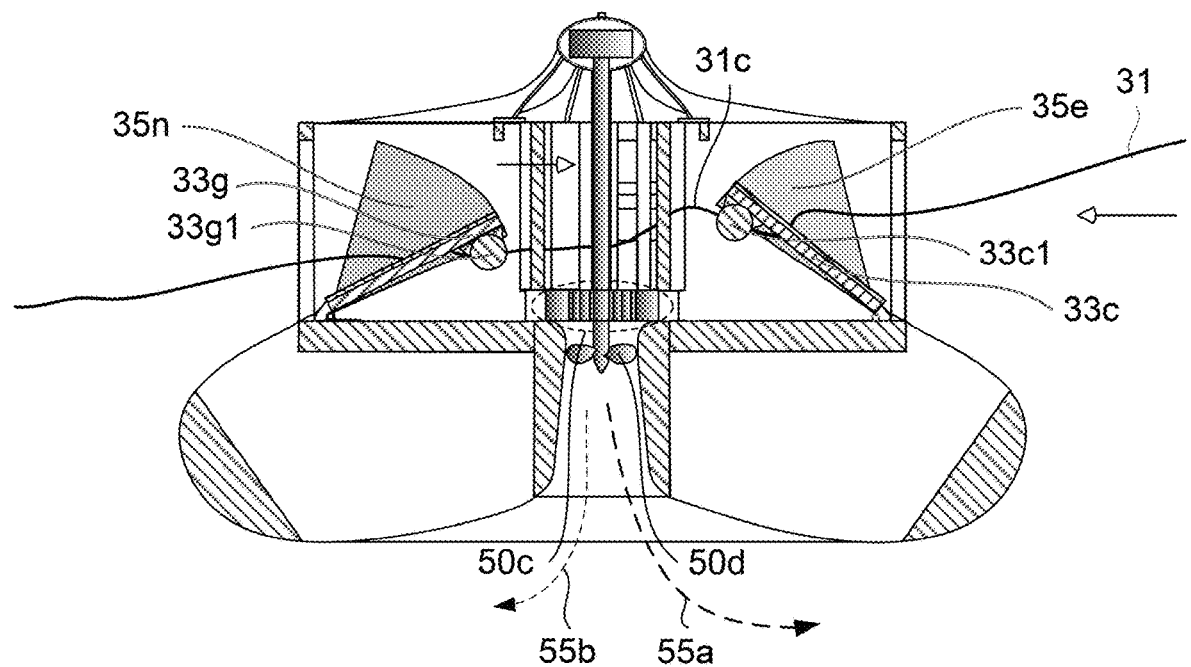
FIG. 6d shows another schematic sectional view of FIG. 6a with an incident wave moving to the left and a reflective wave moving to the right at a later instant in time. Visible is that the incident wave is now rising on the right QS and the reflective wave has reached the right float. Also visible is the wave induced flow of smaller magnitude leaving the turbine-generator assembly.

In FIG. 6d, the reflective wave 31c has now moved to the right and is blocked, raising float 33c1 and thereby raising QS 33c. The pliant seal 35e has undergone more folding action due the upward motion of QS 33c. Minor movement of QS 33g, float 33g1 and pliant seal 35n has occurred. The incident wave 31 is now higher relative to QS 33c. The downward outflow 55a and 55b is now less, after passing through the guide vane assembly 50c and turning UT runner 50d. The surface waves continue to oscillate back and forth, each time being focused into the center, while energized by the incoming incident waves 31. This action will occur from multiple directions as the incident waves bend inward to the WEC. The QS action shown in FIGS. 6a-6d is for one internal oscillation of a regular incident wave. The internal oscillations will vary for trapped irregular ocean waves.

Figure 6E:
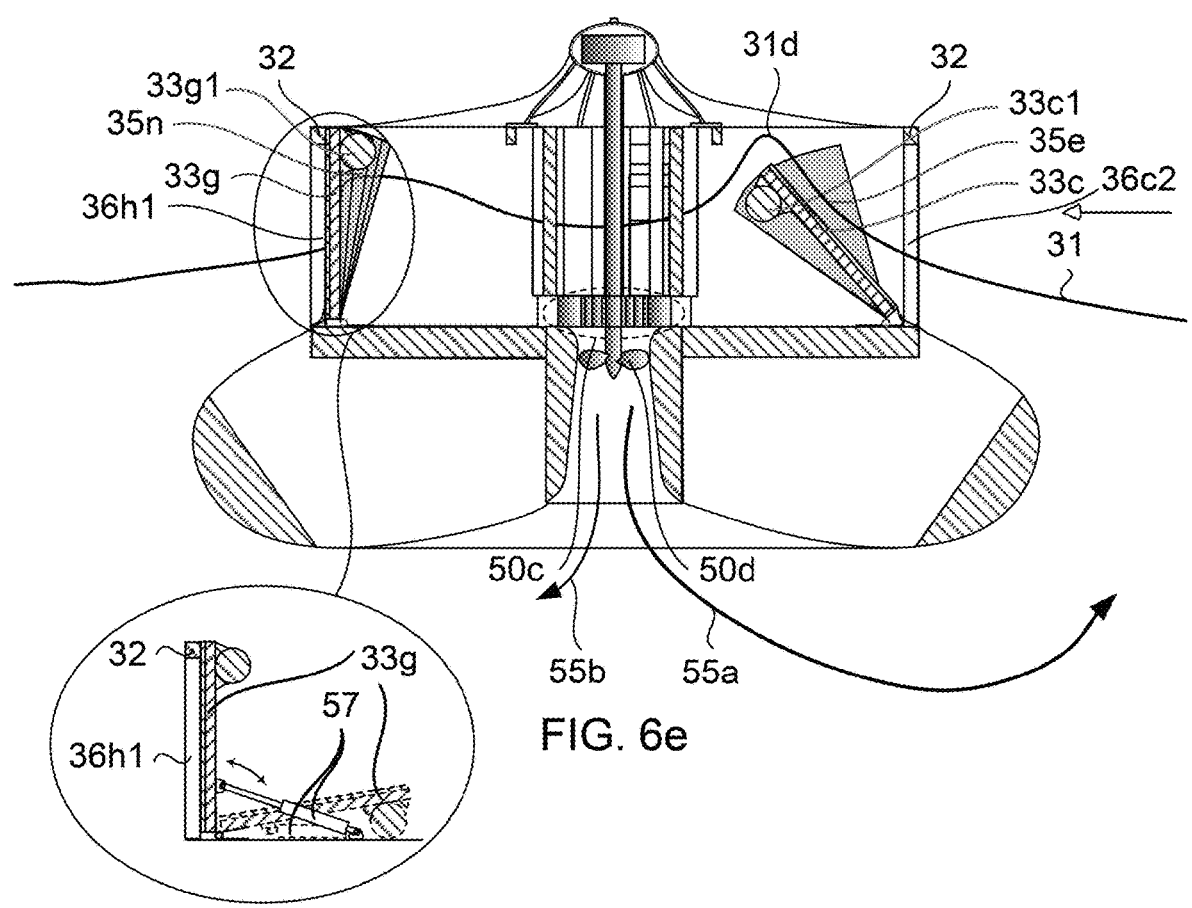
FIG. 6e shows another schematic sectional view of FIG. 6a with a large incident wave moving to the left. Visible is higher wave overtopping of the right float, higher water height of the contained area and wave blocking by the left upright float. Maximum folding of the left pliant seal can be seen while the right is lower due to the forces of the incident wave. Also visible is the wave induced flow of much larger magnitude leaving the turbine-generator assembly.

FIG. 6e shows an occurrence of incident waves 31 of a larger size 31d converging on the WEC. The contained water level reaches a higher level with a larger outflow at 55a and 55b. The flow is shown passing through the guide vane assembly 50c and UT runner 50d, resulting in greater electrical power output. With the increase in water level, a transition point is reached where the outward water pressure in the contained area is sufficient to force QS 33g fully upright against the end-of-travel stop ring 32 and also against end wall 36h1. Depending on the water level, the float 33g1 can now be either fully out of the water or resting on or in the water. The pliant seal 35n experiences the most folding action.

In FIG. 6e1, a dampener 57 such as a spring, tension gas spring (shown) or other restraining device can be employed to slow the rate of impact of QS against the end-of-travel stop: outer channel seal-support ring 32 and end wall 36h1. One dampener 57 is shown in the two extreme positions of QS 33g. Two dampeners would be employed for each QS. The waves are also dampened by the inner blades and the rise of QS. In FIG. 6e, the float 33c1 is under the water as the incident wave pushes down on QS 33c. Pliant seal 35e experiences folding action, but not as much as pliant seal 35n. QS 33c is away from the end-of-travel stop ring 32 and end wall 36c2.

Figure 6F:
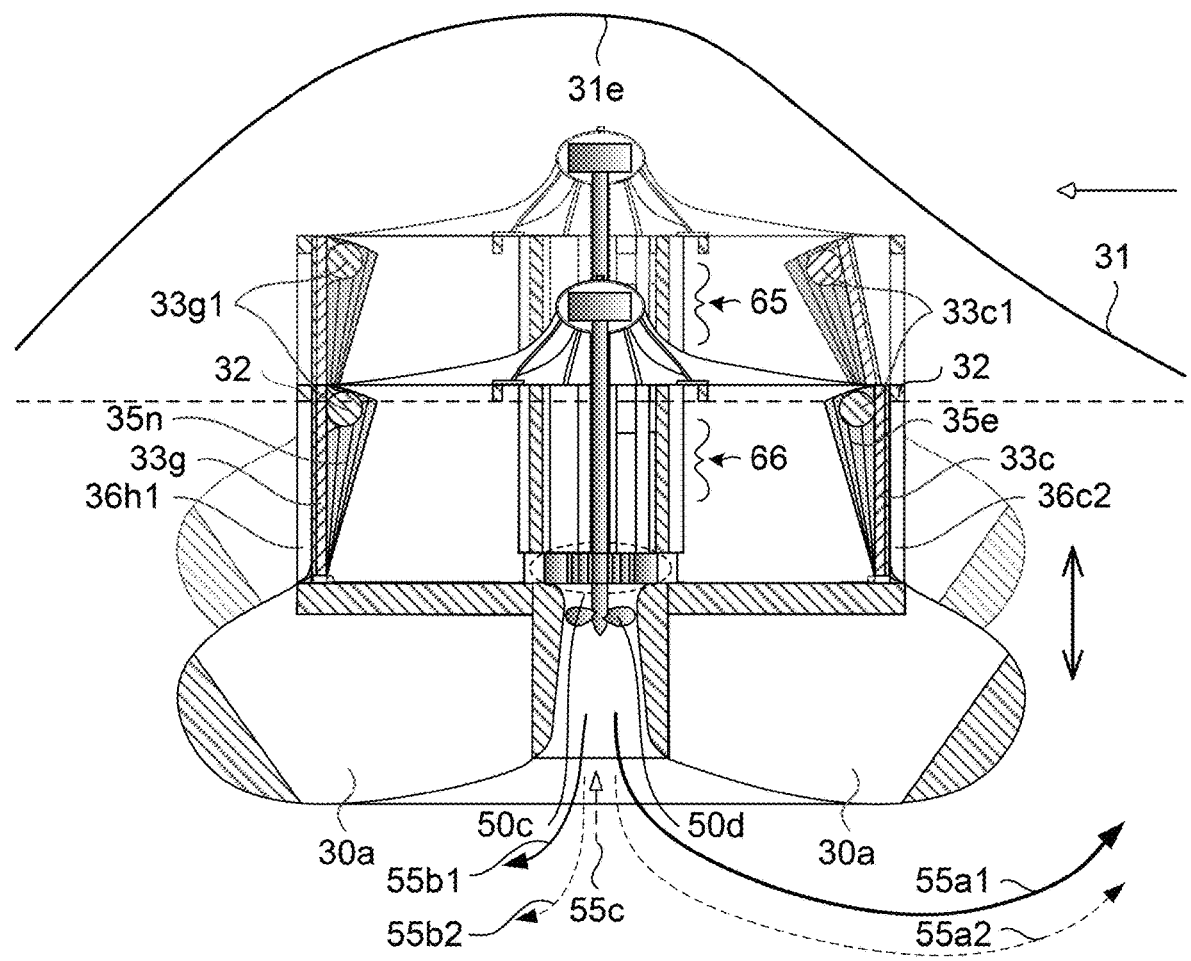
FIG. 6f shows another schematic sectional view of FIG. 6a having two occurrences: the wave moving to the left completely covering the submerged WEC and the second extreme wave condition where the WEC has lowered to where the outer channel seal-support ring is near the SWL (dotted horizontal line). For both conditions, all but one of the floats is in the upright position. Also visible are the two wave induced flows, the much larger magnitude for the first case and the much-reduced flow for the lowered extreme wave condition with the possibility of some positive upward flow.

FIG. 6f shows two positions of the same WEC with different flow conditions through the guide vane assembly 50c and UT runner 50d: 1) when incident waves 31 overtop the WEC 31e: embodiment 65 and 2) the failsafe condition when the air chamber 30a is without air: embodiment 66. The WEC is designed to be fully submerged. When waves overtop, QS 33g and float 33g1 will be at a full upright position against the end-of-travel stop ring 32 and end wall 36h1. The incident waves may again force QS 33c and float 33c1 away from the end-of-travel stop ring 32 and end wall 36c2. Pliant seals 35e and 35n are shown accordingly. The dark lines 55a1 and 55b1 indicate the significant downward flow. Embodiment 66 is an example of a failsafe condition if all the air buoyancy is lost from air chamber 30a, and the WEC is buoyant with ring 32 near the SWL due to previously mentioned buoyancy materials in CS FIG. 5a:36a-36h and horizontal structure FIG. 6a:52. In this condition, the flow is less, as indicated by dotted lines 55a2 and 55b2 and positive flow pulsations may occur in the opening 55c affecting a unidirectional turbine's efficiency. In this condition, float 33c1 is upright.

Figure 6G:
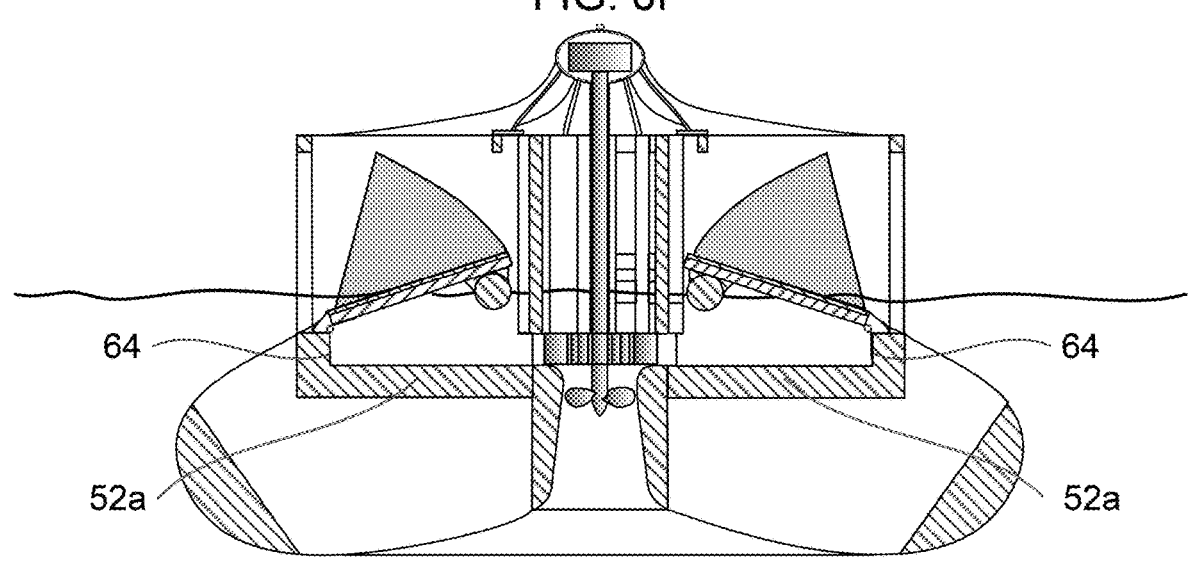
FIG. 6g shows another schematic sectional view of FIG. 6a where the horizontal structure is constructed with a sunken area allowing for improved inner wave reflections especially during low wave conditions.

FIG. 6g shows a schematic sectional view where the horizontal structure 52a has now a sunken area 64. This modification can be done to increase the downward flow through the turbine during lower wave height conditions to improve resonance of reflective waves.

Figure 7:
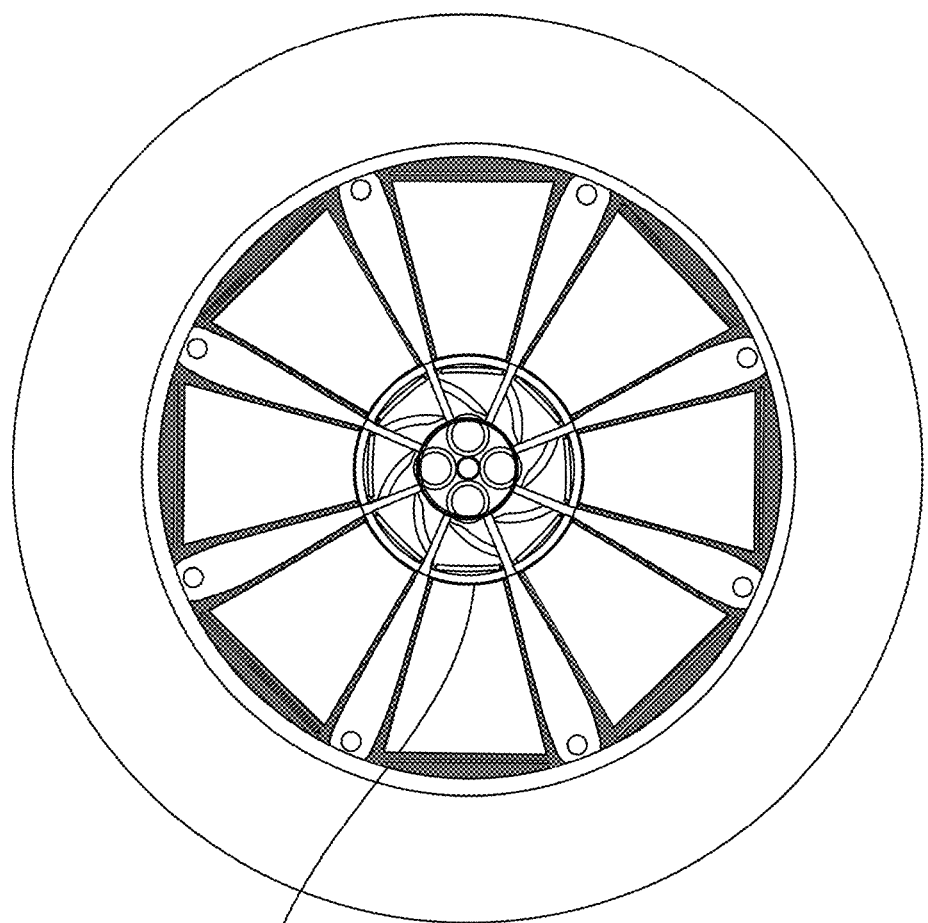
FIG. 7 shows a schematic top view of FIG. 5a modified to include multiple turbine-generator assemblies (four are shown).
Figure 7A:
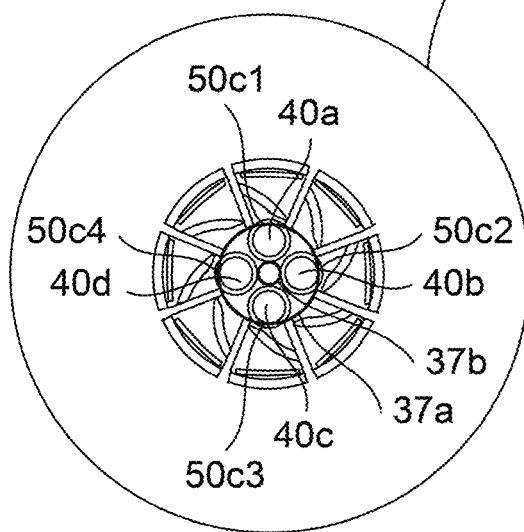
FIG. 7a is a detailed view of FIG. 7 with multiple turbine-generator assemblies showing labeling of waterproof housings containing generators, guide vane assemblies and rings that reinforce the waterproof housings.

FIG. 7 shows that multiple turbine-generator assemblies can be used in the center of the WEC. FIG. 7a is an exploded view of waterproof housings 40a-40d containing in each housing a generator and/or gearbox/brake with respective guide vane assemblies 50c1-50c4. The waterproof housings are reinforced by rings 37a and 37b. Multiple turbines allow for greater flexibility in controlling the exiting flow of water from the water containment area. This is accomplished by restricting the flow through variable guide vane assemblies or closing selected guide vane assemblies. Certain turbines having valves or siphons can also be regulated to limit the flow of water. Multiple turbine-generator assemblies provide redundancy should a turbine-generator become inoperative.

Figure 8:
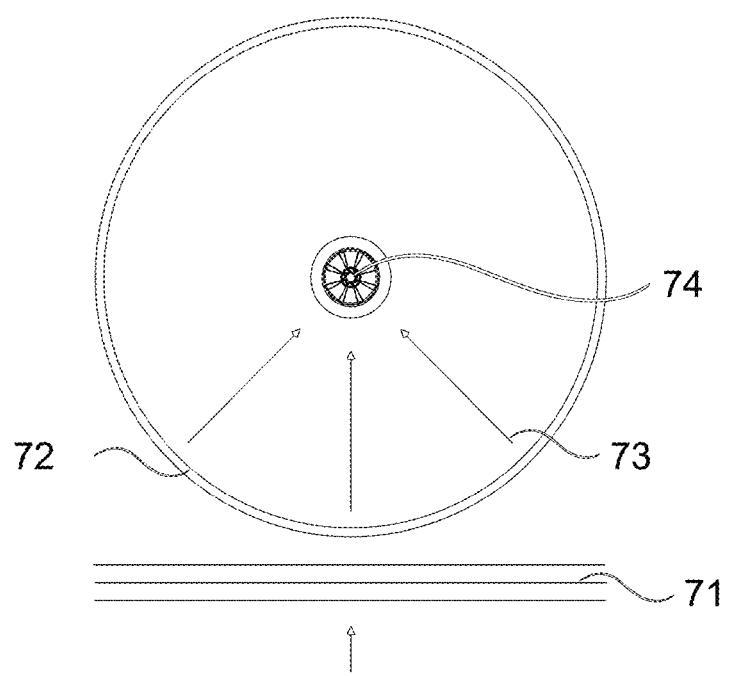
FIG. 8 shows a schematic view of incident waves being bent by a submerged refracting border such that the waves are focused inward to the optimally located WEC.

FIG. 8 shows a schematic view of incident waves 71 being bent inward by a submerged refracting border 72 such that the waves are focused inward 73 to the optimally located WEC 74. With this configuration, the WEC or an array of WECs placed in the focal location will experience concentrated wave energy from a larger wave frontal area.

This WEC is a robust design that can be submerged in extreme wave conditions. Operating over a range of wave frequencies, it is constructed of relatively low-cost materials, maintenance friendly, of low profile and has an aesthetic appearance. Its asymmetric design responds to incident waves in any direction without having to turn into them and its relatively stable body facilitates fixing it to the sea floor. It can be scaled accordingly for both large and small electric power applications to optimize the power output for the available wave climate. When connected to the grid, fluctuations in the flow can be compensated for using an induction, synchronous or permanent magnet generator with a back-to-back electronic converter. An induction motor, while less efficient, can also be used in place of a generator for grid power generation. For the induction motor, power is generated when the downward flow on the turbine blades provides sufficient turbine torque to overcome the motoring torque on the motor/turbine shaft and the motor then acts as a generator. The turbine blades spin driven by the motor when the wave induced downward flow is less prevalent.

The WEC can be deployed in arrays for both deep and shallow water depths and/or optimally placed within a submerged outer wave refracting border. A possible fixed application is having the WEC installed between the supporting legs of abandoned oil platforms. If the device is of sufficient size, wind turbines can be placed on top of the WEC or WECs, especially those that have VUM supports fixed to the ocean floor. The wind turbine can be supported by the WEC's concentric rings. Other possible applications are electrolysis for hydrogen production, desalination, aquaculture, flotsam removal, and reduction of coastal erosion through wave abatement.

It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

What is claimed is:

1. A wave energy converter for converting wave energy from incident surface waves into useful energy, comprising:
   a resonant unidirectional wave energy converter ("RUBHSO") having a horizontally oriented surface with an upper closed perimeter boundary and including an opening formed within the horizontally oriented surface that descends below the horizontally oriented surface;
   a turbine assembly mounted in the opening including a unidirectional turbine runner;
   an air chamber controlling a buoyant position of the RUBHSO; and
   the RUBHSO includes a segmented sealed upper boundary, having both a fixed lower run-up surface and quadrilateral-shaped surfaces, thereby directing overtopping waves toward the opening;
   wherein the RUBHSO is immersed in water positioned near or piercing a still water level of incident surface waves; and
   wherein said RUBHSO so positioned focuses incident oscillating wave energy from said incident surface waves in a predominantly downward unidirectional fluid flow of water into and through the opening formed in the horizontally oriented surface of said RUBHSO thereby driving the turbine assembly.

2. The wave energy converter of claim 1, wherein a shape, a size and a submergence depth of the RUBHSO relative to the incident wave environment cause the predominantly downward unidirectional fluid flow to occur.

3. The wave energy converter of claim 1, wherein a shape, a size and a submergence depth of the RUBHSO relative to the incident wave environment determines the magnitude of the predominantly downward unidirectional fluid flow.

4. The wave energy converter of claim 1, wherein the RUBHSO is primarily axisymmetric in shape and thereby responds to incident waves coming from any direction.

5. The wave energy converter of claim 1, further comprising vertical upright mounting supports fixed to the ocean floor upon which RUBHSO moves upward and downward and locks into a position.

6. The wave energy converter of claim 5, further comprising gear racks attached to said vertical upright mounting supports upon which the RUBHSO moves upward and downward.

7. The wave energy converter according to claim 1, further comprising cables for tethering to a sea floor; wherein the RUBHSO is attached to the cables, thereby firmly maintaining the position of the RUBHSO.

8. The wave energy converter according to claim 1, wherein the RUBHSO includes an outer fixed run-up surface thereby causing overtopping waves to be directed toward the opening.

9. The wave energy converter according to claim 1, further comprising multiple turbine-generator assemblies.

10. The wave energy converter according to claim 9, further comprising variable guide vanes, a valve, or a siphon for each of the multiple turbine assemblies to regulate water exiting through the multiple turbine assemblies, thereby maximizing power output.

11. The wave energy converter of claim 1, further comprising one or more turbines, each coupled to a generator located within a waterproof housing; and wherein the waterproof housing is placed above or below the still water level.

12. The wave energy converter according to claim 1, wherein more than one RUBHSO is placed in an array including at least one turbine-generator assembly for each RUBHSO.

13. The wave energy converter according to claim 12, wherein the array is placed within a submerged refracting border.

14. The wave energy converter of claim 1, further comprising a detachable external perimeter screening that when detached can collect flotsam from the ocean.

15. The wave energy converter according to claim 1, further comprising a generator adapted to generate electricity during fluctuations in the downward unidirectional flow; wherein the generator is adapted by including a device selected from a group consisting of a back-to-back electronic converter and an induction motor.

16. The wave energy converter of claim 1, wherein the upper closed perimeter boundary of the RUBHSO is non-segmented and the RUBHSO is positioned by raising or lowering said RUBHSO to adjust for incident wave and tidal conditions resulting in net downward flow on the unidirectional turbine runner; and wherein the turbine-generator further comprises a turbine-generator shaft and further comprising a flywheel coupled to the turbine-generator shaft to smoothen turbine-generator rotation.

17. The wave energy converter of claim 1, further comprising buoyancy floats attached to the segmented sealed upper boundary, and wherein water waves are channeled by a run-up surface into the RUBHSO and the segmented sealed upper boundary when moved due to the action of the buoyancy floats adjusts to incident waves, independent of the positioning of the RUBHSO; thereby resulting in increased stored water head within the contained area of RUBHSO; and thereby smoothing turbine-generator rotation and increasing power output.

18. The wave energy converter of claim 17, further comprising a segmented boundary of multiple channel seal-supports attached to quadrilateral-shaped surfaces with floats and hinges that together increase capture of water from overtopping waves and thereby increase the water level in the contained area.

19. The wave energy converter of claim 18, wherein the RUBHSO further comprises a horizontal structure and pliant seals to prevent water leakage from a contained area wherein the seals are adherent around the edges of multiple quadrilateral-shaped surfaces and said seals are adherent to channel seal-supports and adherent to the horizontal structure of the RUBSHO where the pliant seals cover hinges.

20. The wave energy converter of claim 17, further comprising multiple quadrilateral-shaped surfaces that inhibit exiting of captured waves.

21. The wave energy converter of claim 20, further comprising inner and outer concentric channel seal-supporting rings that add structural integrity and the outer ring acts as a travel stop for the quadrilateral-shaped surfaces.

22. The wave energy converter of claim 21, wherein the RUBHSO is locked to vertical upright mounting supports fixed to a sea floor; and further comprising a wind turbine above the RUBHSO supported by concentric channel seal-supporting rings.

23. The wave energy converter of 17, further comprising multiple ganged inner blades that are driven together.

* * * * *